(12) United States Patent
Yonushonis et al.

(10) Patent No.: US 7,967,887 B1
(45) Date of Patent: Jun. 28, 2011

(54) EXHAUST AFTERTREATMENT FILTER WITH REDUCED MAXIMUM TEMPERATURE

(75) Inventors: Thomas M. Yonushonis, Columbus, IN (US); Conrad J. Simon, III, Columbus, IN (US); Bryan E. Blackwell, Brownsburg, IN (US); Matthew L. Anderson, Columbus, IN (US); Gary Salemme, Columbus, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 841 days.

(21) Appl. No.: 11/556,248

(22) Filed: Nov. 3, 2006

(51) Int. Cl.
*B01D 39/14* (2006.01)
*B01D 39/06* (2006.01)
*B01D 39/00* (2006.01)
*B01J 23/00* (2006.01)
*B01D 50/00* (2006.01)

(52) U.S. Cl. ............. 55/523; 55/522; 55/524; 502/303; 422/169; 422/170; 422/171; 422/172; 422/177; 422/178; 422/179; 422/180; 422/181; 422/182

(58) Field of Classification Search ............ 55/522–524; 422/169–182; 502/303
See application file for complete search history.

(56) References Cited

U.S. PATENT DOCUMENTS

| | | | |
|---|---|---|---|
| 3,162,516 A * | 12/1964 | Dwyer | 95/274 |
| 3,996,740 A * | 12/1976 | Niebylski | 60/299 |
| 4,017,347 A * | 4/1977 | Cleveland | 156/89.27 |
| 4,419,108 A | 12/1983 | Frost et al. | |
| 4,652,286 A | 3/1987 | Kusuda et al. | |
| 4,667,469 A * | 5/1987 | Abthoff et al. | 60/311 |
| 4,851,381 A * | 7/1989 | Hums | 502/209 |
| 4,960,449 A | 10/1990 | Yonushonis | |
| 4,965,243 A * | 10/1990 | Yamada et al. | 502/304 |
| 5,089,237 A | 2/1992 | Schuster et al. | |
| 5,100,632 A * | 3/1992 | Dettling et al. | 423/213.5 |
| 5,322,537 A | 6/1994 | Nakamura et al. | |
| 5,403,558 A | 4/1995 | Kono et al. | |
| 5,709,722 A | 1/1998 | Nagai et al. | |
| 5,720,787 A | 2/1998 | Kasai et al. | |
| 5,846,276 A | 12/1998 | Nagai et al. | |
| 5,851,249 A | 12/1998 | Henda et al. | |
| 5,853,459 A | 12/1998 | Kuwamoto et al. | |
| 5,863,311 A | 1/1999 | Nagai et al. | |
| 5,951,956 A * | 9/1999 | Muraki et al. | 423/213.5 |
| 6,110,860 A * | 8/2000 | Inoue et al. | 502/218 |
| 6,174,835 B1 * | 1/2001 | Naito et al. | 502/325 |
| 6,497,848 B1 * | 12/2002 | Deeba et al. | 422/180 |
| 6,540,816 B2 | 4/2003 | Allie et al. | |
| 6,544,310 B2 | 4/2003 | Badeau et al. | |
| 6,669,913 B1 | 12/2003 | Haberkamp | |
| 6,776,814 B2 | 8/2004 | Badeau et al. | |
| 6,815,038 B2 * | 11/2004 | Morimoto et al. | 428/116 |
| 7,052,532 B1 * | 5/2006 | Liu et al. | 96/154 |
| 7,159,390 B2 * | 1/2007 | Saito et al. | 60/297 |
| 2002/0049137 A1 * | 4/2002 | Morikawa et al. | 502/351 |
| 2002/0141910 A1 * | 10/2002 | Adiletta | 422/171 |
| 2003/0037675 A1 * | 2/2003 | Gillingham et al. | 95/280 |
| 2003/0113596 A1 * | 6/2003 | Huang et al. | 429/16 |
| 2004/0052699 A1 * | 3/2004 | Molinier et al. | 422/180 |

(Continued)

*Primary Examiner* — Walter D Griffin
*Assistant Examiner* — Amber Orlando
(74) *Attorney, Agent, or Firm* — Andrus, Sceales, Starke & Sawall, LLP; J. Bruce Schelkopf

(57) ABSTRACT

An exhaust aftertreatment filter and method is provided for filtering engine exhaust, and reduces the maximum temperature experienced by the filter including during regeneration including during burn-off of trapped contaminant particulate including carbon oxidation combustion.

22 Claims, 7 Drawing Sheets

U.S. PATENT DOCUMENTS

| | | | |
|---|---|---|---|
| 2004/0072687 A1* | 4/2004 | Sekiba et al. | 502/325 |
| 2004/0231307 A1* | 11/2004 | Wood et al. | 55/523 |
| 2005/0011186 A1* | 1/2005 | Saito et al. | 60/297 |
| 2005/0163689 A1* | 7/2005 | Akerman et al. | 423/177 |
| 2005/0183405 A1* | 8/2005 | Gillingham et al. | 55/486 |
| 2006/0292051 A1* | 12/2006 | Sekiba et al. | 423/213.5 |
| 2007/0041881 A1* | 2/2007 | Voss et al. | 422/177 |
| 2007/0189936 A1* | 8/2007 | Suwabe et al. | 422/177 |
| 2008/0010960 A1* | 1/2008 | Paisley et al. | 55/523 |
| 2008/0047243 A1* | 2/2008 | Beall et al. | 55/523 |
| 2008/0219907 A1* | 9/2008 | Sekiba et al. | 423/213.7 |

* cited by examiner

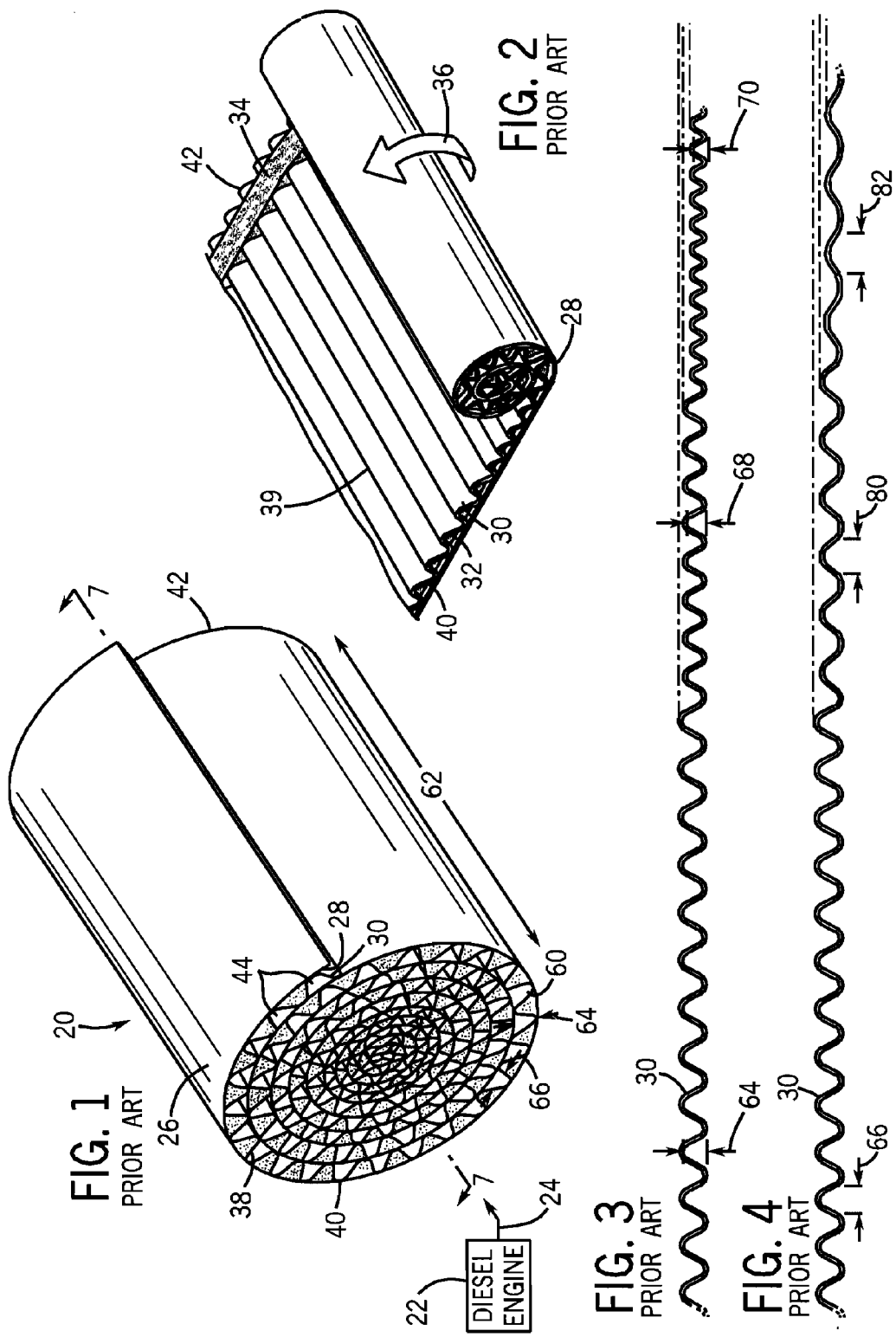

EXHAUST AFTERTREATMENT FILTER WITH REDUCED MAXIMUM TEMPERATURE

BACKGROUND AND SUMMARY

The invention relates to exhaust aftertreatment filters for filtering exhaust from internal combustion engines, including diesel engines.

Exhaust aftertreatment filters for diesel engines are known in the prior art. The filter traps contaminant particulate in the exhaust. The filter is composed of regenerable material which is regenerated by heat to burn-off the trapped contaminant particulate. The filter includes a filter element, e.g. ceramic such as cordierite. Diesel particulate filters are subject to high temperatures due to the exothermic reaction of carbon and oxygen. Temperatures are typically controlled by controlling the regeneration process, i.e. the burning of carbon, e.g. by limiting the carbon content per filter volume.

The present invention addresses and solves the need for limiting the maximum temperature experienced by the filter including during regeneration including during burn-off of trapped contaminant particulate including carbon oxidation combustion.

BRIEF DESCRIPTION OF THE DRAWINGS

Prior Art

FIGS. 1-11 are similar to FIGS. 1-11, respectively, of U.S. Pat. No. 6,544,310, incorporated herein by reference.

FIG. 1 is an isometric assembled view of an exhaust aftertreatment filter constructed in accordance with the '310 patent.

FIG. 2 illustrates spiral-winding to provide the filter roll of FIG. 1.

FIG. 3 is an end elevation view of corrugated serpentine pleats before winding.

FIG. 4 is like FIG. 3 and shows another embodiment.

FIG. 5 is an isometric view showing a sheet having the corrugated serpentine pleats of FIG. 3 thereon prior to winding.

FIG. 6 is an isometric view showing a sheet having the corrugated serpentine pleats of FIG. 4 thereon prior to winding.

FIG. 7 is a cross-sectional view taken along line 7-7 of FIG. 1.

FIG. 8 is like FIG. 7 and shows another embodiment.

FIG. 9 is similar to FIG. 5 and shows another embodiment.

FIG. 10 is a top plan view of the sheet and pleats of FIG. 9.

FIG. 11 is a sectional view of a filter roll after spiral-winding of the sheet and pleats of FIG. 9.

Present Invention

Figure 9:
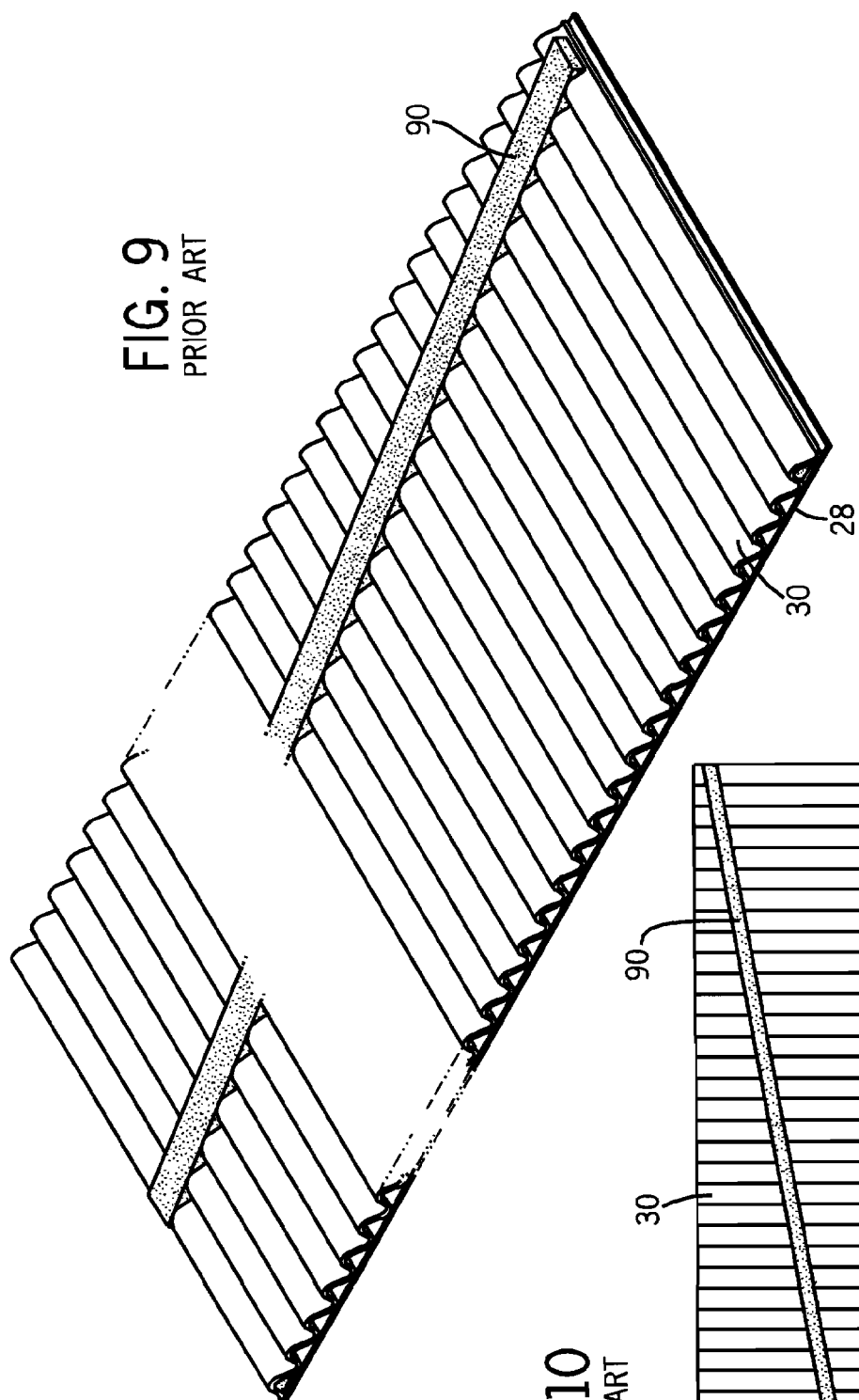
Figure 12:
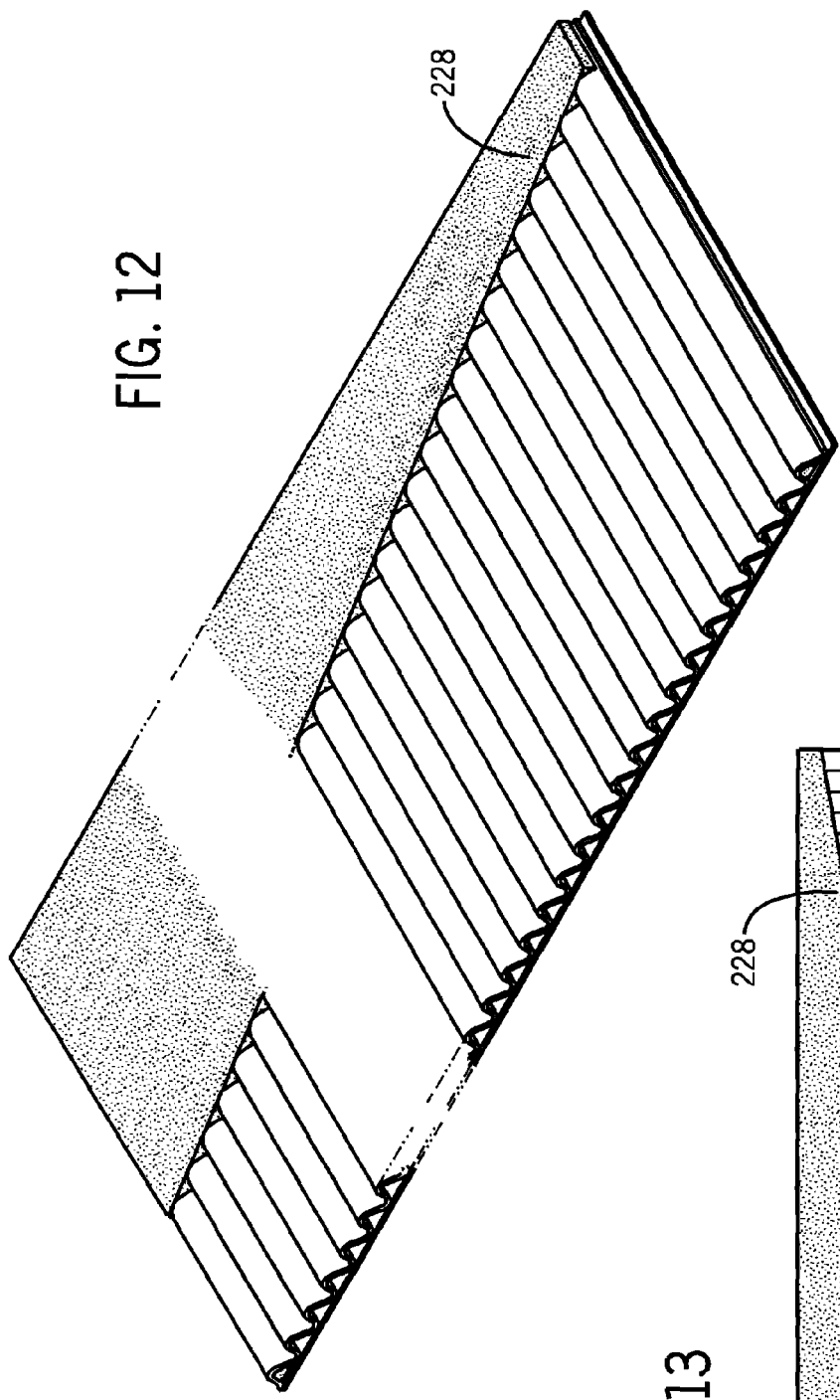

FIG. 12 is like FIG. 9, and illustrates the present invention.

Figure 10:
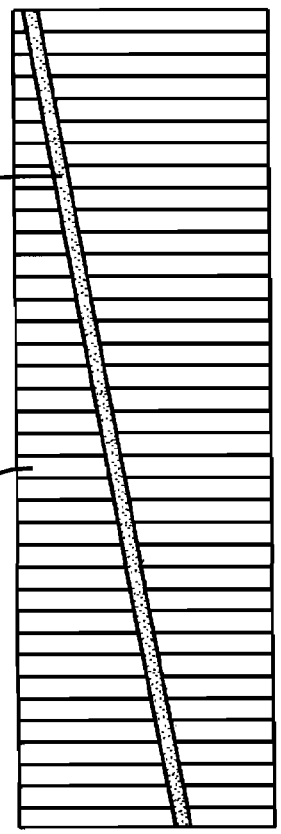
Figure 13:
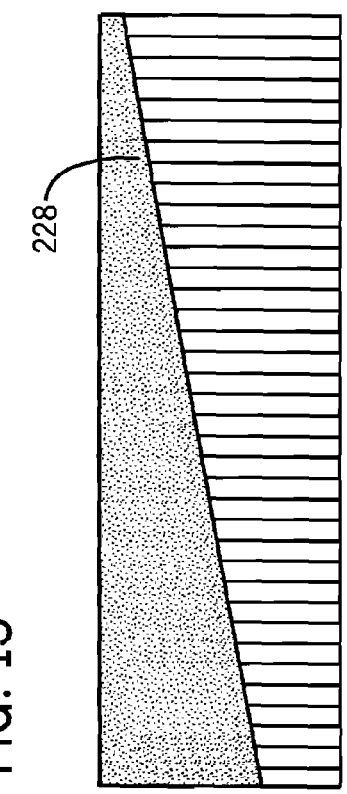

FIG. 13 is like FIG. 10 and is a top plan view of the sheet of FIG. 12.

Figure 11:
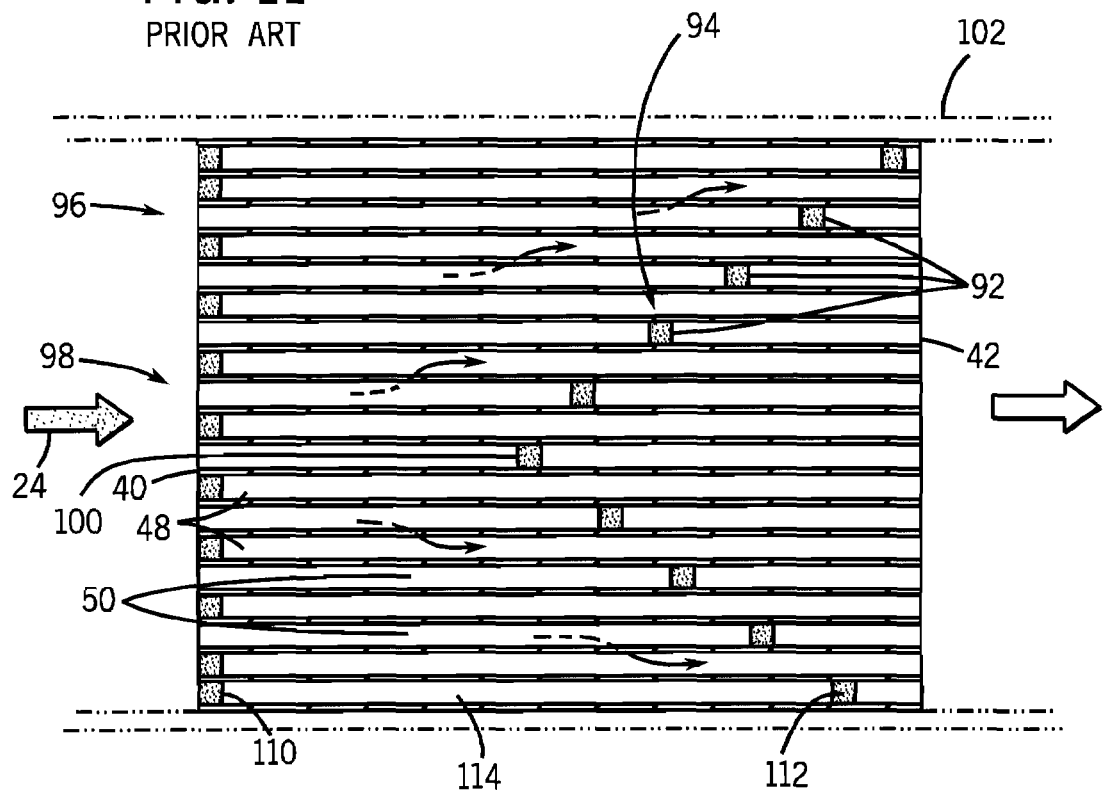
Figure 14:
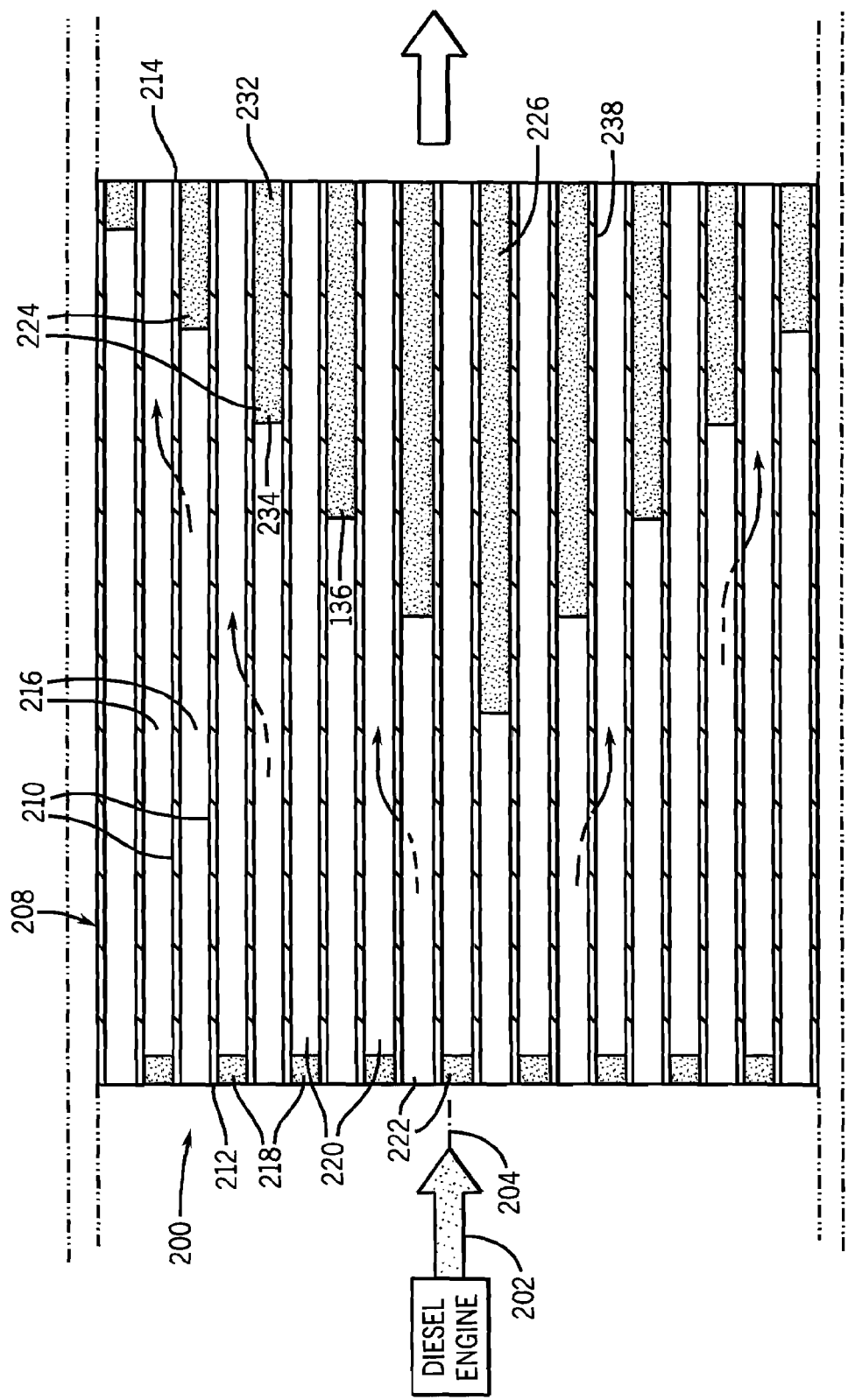

FIG. 14 is like FIG. 11 and is a sectional view of a filter roll after spiral-winding of the sheet of FIG. 12.

DETAILED DESCRIPTION

Prior Art

The following description of FIGS. 1-11 is taken from the noted '310 patent.

FIG. 1 shows an exhaust aftertreatment filter 20 for filtering exhaust from an internal combustion engine, such as diesel engine 22, flowing along an axial direction 24. The filter is provided by an axially extending cylindrical filter roll 26 spiral-wound from a sheet 28, FIGS. 1 and 2, having corrugated serpentine pleats 30 thereon. Upstream and downstream axially spaced sealing beads 32 and 34, for example adhesive strips or the like, extend transversely across the pleats, one of the beads, such as 32 being below the pleats, and the other bead such as 34 being above the pleats. Spiral-winding of sheet 28 and pleats 30 as shown at arrow 36 in FIG. 2 yields cylindrical filter roll 26 having a plurality of concentric layers with pleats therebetween defined by wall segments 38 extending radially in corrugated serpentine manner between pleat tips at axially extending bend lines 39. The structure described thus far is known in the prior art and is further schematically illustrated at 20a in FIG. 23. Wall segments 38 extend axially between upstream and downstream ends 40 and 42, respectively. The wall segments define axial flow channels 44 therebetween. The wall segments are alternately sealed to each other by a first upstream set of plugs 46 to define a first set of flow channels 48 closed by plugs 46, and a second set of flow channels 50 interdigitated with first set of flow channels 48 and having open upstream ends. Plugs 46 are provided by bead 32. The wall segments are alternately sealed to each other by a second downstream set of plugs 52 closing the second set of flow channels 50. Plugs 52 are provided by bead 34. The first set of flow channels 48 have open downstream ends. This structure is known in the prior art, for example as shown in U.S. Pat. Nos. 4,652,286 and 5,322,537, incorporated herein by reference.

During operation, exhaust from engine 22 flows along axial direction 24 through filter 20a, FIG. 23. The exhaust flows axially into the filter through the open upstream ends of flow channels 50, then passes through wall segments 38 of the pleats, as shown at arrows 54, and then flows through the open downstream ends of flow channels 48. Contaminant particulate such as soot is trapped and accumulates in the filter. Pleated media 30 and sheet 28 of the filter are composed of regenerable material, for example ceramic material as in U.S. Pat. Nos. 4,017,347, 4,652,286, 5,322,537, 6,444,006, all incorporated herein by reference. The filter is regenerated by heat, for example as disclosed in U.S. Pat. Nos. 5,014,509, 5,052,178, 5,063,736, incorporated herein by reference, to burn-off the trapped contaminant particulate. The regeneration heat may be provided by microwave energy, a gas burner, electrical heating, etc., as is known. It has been observed that regeneration of the filter sometimes results in meltdown occurring in the center of the outlet side of the filter. It is believed that this is due to accumulation of particulate soot as shown at hot-spot 56 in FIG. 23 at the outlet side because of wall-flow characteristics, i.e. particulate soot trapped at the closed downstream ends of flow channels 50. The invention of the '310 patent recognizes and solves this problem by varying the sizes of the flow channel cells to spread trapped particulate along a distribution pattern reducing heat concentration and the risk of melting during regeneration, to minimize hot-spot meltdown otherwise caused by high density concentration of trapped particulate during regeneration.

The noted flow channels define cells 60, FIG. 1, having an axial length 62, a radial height 64, and a circumferentially arcuate width 66. Varying cell sizes are provided, to spread trapped particulate along a distribution pattern reducing heat concentration and the risk of melting during regeneration, to minimize hot-spot meltdown otherwise caused by high density concentration of trapped particulate during regeneration, as noted above. As will be described, embodiments are provided for varying the volumes, heights, widths, and lengths of the cells, to provide different volumes, heights, widths, and lengths. These arrangements provide better flow distribution as well as allowing improved microwave penetration because of fewer walls in some embodiments, and reducing the mass that must be heated for other forms of regeneration such as with a gas burner or electric heating. In other embodiments, a variable cell area is provided along the flow channel from the upstream to the downstream end, promoting more even gas flow through the walls for even loading and lower pressure drop. The drawings use like reference numerals from above where appropriate to facilitate understanding.

In the embodiment of FIGS. 1-3, 5, the noted heights of the cells are varied, as shown at highest height 64, FIG. 3, intermediate height 68, and lowest height 70. Upon spiral-winding from right to left in FIGS. 3 and 5, the highest radial height flow channels at 64 are in the radially outward portions 72, FIG. 7, of the filter roll, and the shortest radial height flow channels at 70 are in the radially inward portions 74 of the filter roll. The larger cells at outer portion 72 allow for more flow to the outside of the filter, to reduce central hot-spot accumulation. In another embodiment, upon spiral-winding from left to right in FIGS. 3 and 5, the shortest radial height flow channels at 70 are in the radially outward portions 76, FIG. 8, of the filter roll, and the highest radial height flow channels at 64 are in the radially inward portions 78 of the filter roll. This embodiment may minimize the noted meltdown problem in those applications where it is desired to have better flow characteristics through the middle of the filter with less accumulation. The differing embodiments of FIGS. 7 and 8 can be selectively applied to exhaust systems having differing flow characteristics. In some systems, it may be desired to have the higher height larger cells in the radially outer portions of the filter roll as in FIG. 7, whereas in other systems it may be desirable to have the higher height larger cells in the radially inward portions of the filter roll as in FIG. 8. The present invention enables either embodiment.

Figure 6:
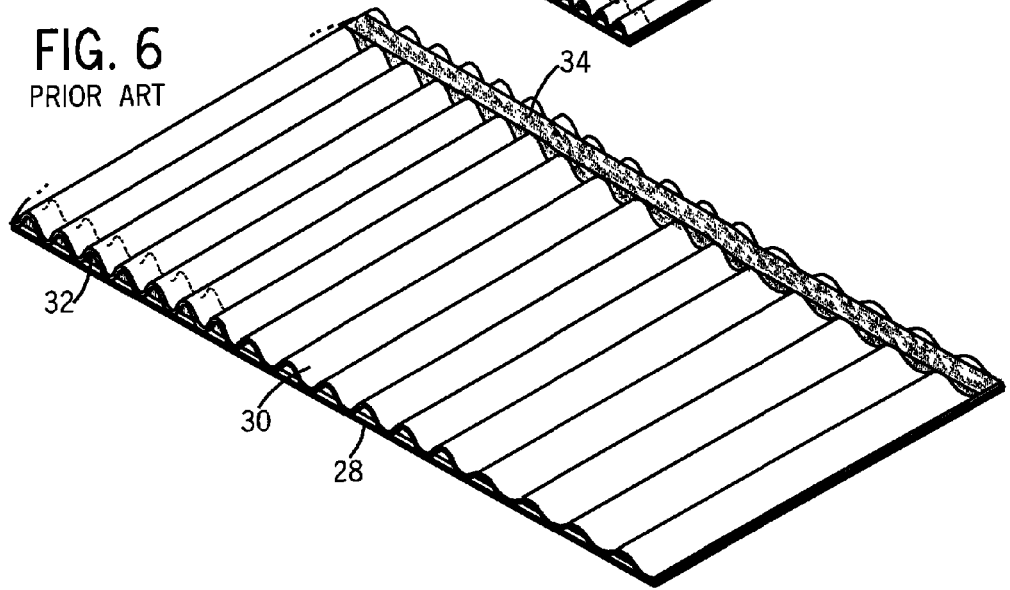
Figure 7:
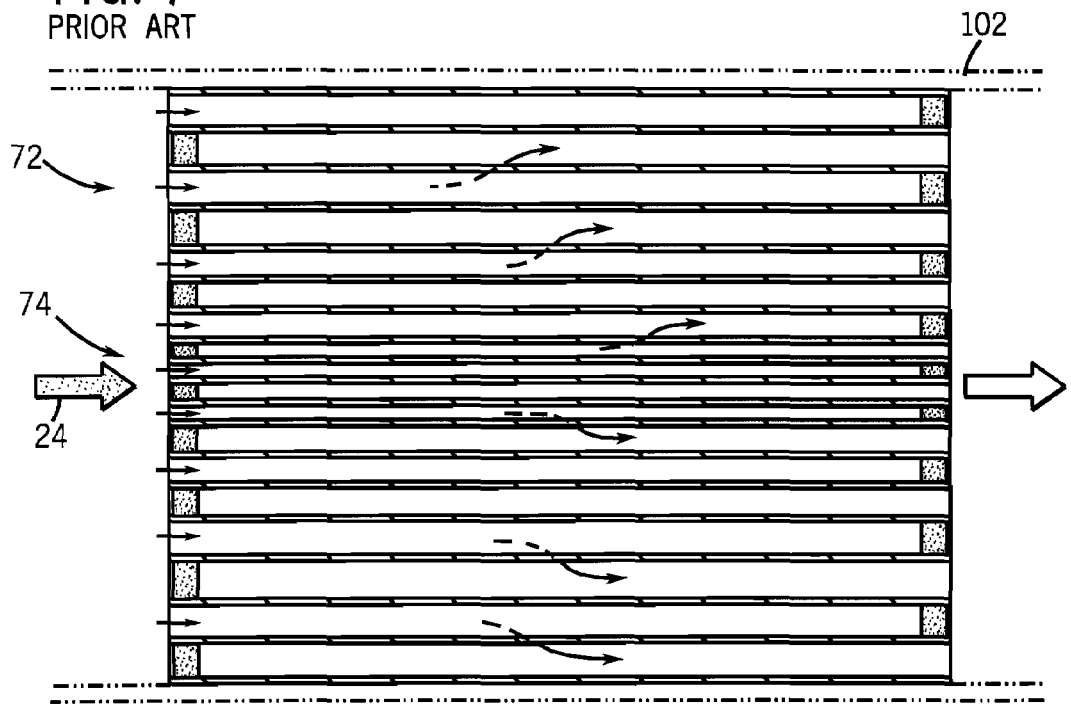
Figure 8:
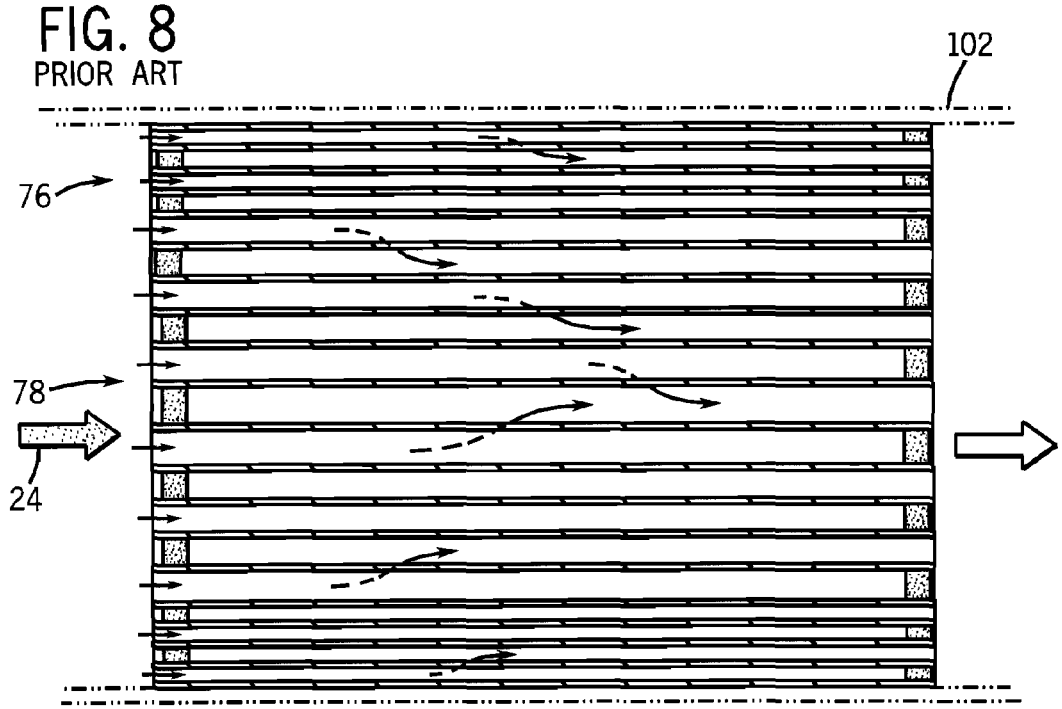

In another embodiment as illustrated in FIGS. 4 and 6, the noted widths of the cells are varied, for example as shown at narrowest width 66, intermediate width 80, and widest width 82. Different height pleats may be provided as shown in FIG. 4, or the same pleat height may be provided. Upon right to left spiral-winding in FIG. 4, the narrowest arcuate width flow channels at 66 are in radially outward portions of the filter roll, and the widest width flow channels are in the radially inward portions of the filter roll. Upon left to right spiral-winding, the widest width flow channels are in the radially outward portions of the filter roll, and the narrowest width flow channels are in the radially inward portions of the filter roll.

Figure 2A:
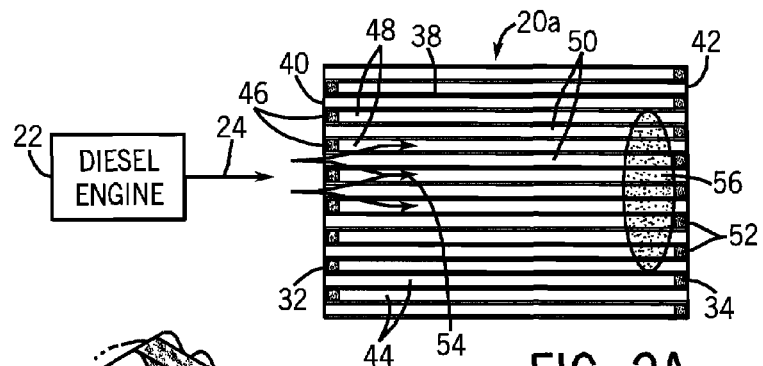
FIG. 2a is a sectional view of a spiral-wound filter illustrating the prior art.
Figure 5:
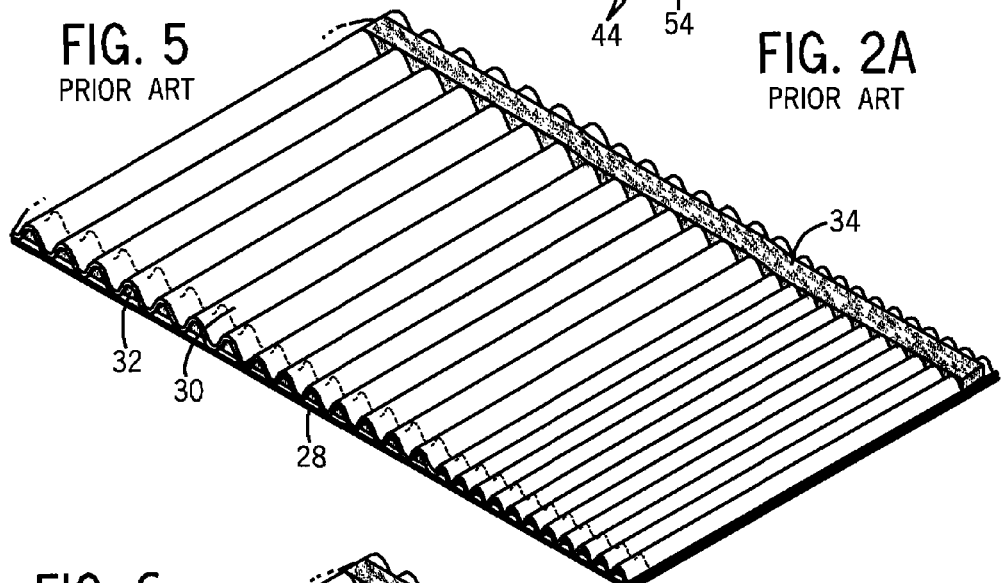

In another embodiment, the lengths 62 of the cells are varied, as illustrated in FIGS. 9-11. Downstream sealing bead 34 in FIG. 2 is replaced by diagonal sealing bead 90, such that upon left to right spiral-winding in FIGS. 9 and 10 a downstream set of plugs 92, FIG. 11, is provided in a step pattern 94 having a plurality of steps of varying axial spacing from downstream axial end 42 of the filter roll. The longest axial length flow channels are in the radially outward portions 96 of the filter roll, and the shortest axial length flow channels are in the radially inward portions 98 of the filter roll. Step pattern 94 has a V-shape in cross-section of the filter roll, with the apex 100 of the V pointing toward upstream end 40, and the legs of the V diverging from such apex and extending toward downstream end 42. Exhaust contaminant particulate trapped at the closed downstream ends of flow channels 50 is spread axially in the filter along such legs. V-shaped step pattern 94 spreads trapped particulate axially therealong to provide a distribution pattern reducing heat concentration and the risk of melting during regeneration, to minimize hot-spot meltdown otherwise caused by high density concentration of trapped particulate during regeneration. In the embodiment of FIG. 11, flow channels 50 have differing axial lengths, whereas flow channels 48 have the same axial length.

Present Invention

FIGS. 12-14 shown an exhaust aftertreatment filter 200 for filtering engine exhaust 202 flowing along an axial direction 204 from an internal combustion engine such as diesel engine 206. Filter 200 is composed of regenerable material, as above, regenerated by heat to burn-off trapped contaminant particulate, including carbon oxidation combustion, from the engine exhaust. The filter is provided by an axially extending filter element 208 having wall segments 210 extending axially between upstream and downstream ends 212 and 214. The wall segments define axial flow channels 216 therebetween. The wall segments are alternately sealed to each other by a first set of plugs 218 to define a first set of flow channels 220 closed by plugs 218, and a second set of flow channels 222 interdigitated with the first set of flow channels 220 and having open upstream ends. Wall segments 210 are alternately sealed to each other by a second set of plugs 224 closing the second set of flow channels 222 at the downstream end. The first set of flow channels 220 has open downstream ends.

In the embodiment of FIG. 14, the second set of plugs 224 have variable axial lengths selectively chosen and located to place longer axial length plugs such as 226 at hotter regions of the filter, which may be the center core or may be other regions, to eliminate carbon otherwise present thereat, and to thus decrease available carbon for combustion thereat and reduce maximum temperature experienced by the filter during regeneration including during burn-off of trapped contaminant particulate including carbon oxidation combustion. Diagonal sealing bead 90 of FIGS. 9-11 is replaced in FIGS. 12-14 with axially elongated diagonal sealing bead or sheet 228. Upon left to right spiral-winding in FIGS. 12 and 13, the axially elongated diagonal sealing bead 228 provides the noted second set of plugs 224, FIG. 14, of variable axial lengths, whereby to provide different axial length plugs laterally spaced from each other. In one embodiment, the different axial length plugs 224 have a downstream end 232 at the downstream end 214 of the wall segments and extend axially upstream therefrom along the noted different axial lengths to respective upstream ends such as 234, 236, etc. at respective differing axial locations along the filter element. In one embodiment, the second set of plugs 224 are axially elongated and selectively chosen as to axial length and are selectively laterally located to provide respective localized heat sinks including additional thermal mass selectively modifying thermal distribution in and heat capacity of the filter and/or to selectively modify carbon distribution in the filter.

In further embodiments, a designated constituent material is provided by at least one of a) a constituent material of the second set of plugs 224 and b) a coating material such as 238 along at least some of the wall segments 210 including adjacent the second set of plugs 224, with the noted designated constituent material undergoing an energy level change at a designated temperature, the energy level change being selected from the group consisting of i) phase change and ii) melting, and selected such that the energy level change at the designated temperature requires additional energy to effect the noted energy level change, to thus reduce maximum temperature experienced by the filter including during regeneration including during the noted burn-off of trapped contaminant particulate including carbon oxidation combustion.

In one embodiment, the noted designated constituent material is selected from the group consisting of hydroxides, carbonates, nitrates, and oxides. In a further embodiment, with the engine exhaust being diesel engine exhaust, the designated constituent material is selected from the group consisting of calcium salt and barium salt, forming one of a carbonate and a nitrate when exposed to diesel engine exhaust. In a further embodiment, the noted designated constituent material is $Ba(NO_3)_2$ which melts at 594° C. and requires additional heat of fusion energy. In a further embodiment, the noted designated constituent material is $MoO_3$ which melts at 795° C. and requires additional heat of fusion energy. In a further embodiment, the noted designated constituent material is selected to melt at a temperature in the range 550° C. to 1000° C. and requires additional heat of fusion energy, to thus reduce the noted maximum temperature experienced by the filter. In a further embodiment, the noted designated constituent material is selected to provide the reaction $CaCO_3 \rightarrow CaO+CO_2$ and requiring additional energy for such reaction to proceed, to thus reduce the noted maximum temperature experienced by the filter. In a further embodiment, the noted designated constituent material is selected to provide the reaction $(Fe_2O_2)+3C \rightarrow 4Fe+3(CO_2)$ and requiring additional energy for such reaction to proceed, to thus reduce the noted maximum temperature experienced by the filter. In a further embodiment, the noted designated constituent material is selected to provide an endothermic reaction requiring additional energy for such reaction to proceed, to thus reduce the noted maximum temperature experienced by the filter.

The system provides a method for reducing the maximum temperature experienced by an exhaust aftertreatment filter during regeneration including during burn-off of trapped contaminant particulate, in one embodiment the method including providing a designated constituent material by at least one of a) a constituent material of the second set of plugs 224 and b) a coating material 238 along at least some of the wall segments including adjacent the second set of plugs, selecting the designated constituent material to undergo an energy level change at a designated temperature, selecting the energy level change from the group consisting of i) phase change and ii) melting, and selecting the energy level change at the designated temperature to require additional energy to effect the energy level change, to reduce maximum temperature experienced by the filter during regeneration including during burn-off of trapped contaminant particulate. In another embodiment, the method includes selecting the designated constituent material to melt at a temperature in the range 550° C. to 1000° C. and to require additional heat of fusion energy, to reduce maximum temperature experienced by the filter. In another embodiment, the method includes selecting the designated constituent material to provide an endothermic reaction requiring additional energy for such reaction to proceed, to reduce the maximum temperature experienced by the filter. The system provides a method for reducing maximum temperature experienced by an exhaust aftertreatment filter during regeneration including during burn-off of trapped contaminant particulate including carbon oxidation combustion, in one embodiment the method including providing the second set of plugs 224 with variable axial lengths and selectively choosing and locating the plugs by selectively locating and placing longer axial length plugs at hotter regions of the filter to eliminate carbon otherwise present thereat and decrease available carbon for combustion thereat, to reduce maximum temperature experienced by the filter including during regeneration including during burn-off of trapped contaminant particulate including carbon oxidation combustion. In another embodiment, the method includes selectively choosing the plugs 224 of the second set as to axial length and selectively laterally locating the plugs of the second set to provide respective localized heat sinks including additional thermal mass selectively modifying thermal distribution in and heat capacity of the filter. In another embodiment, the method includes selectively choosing the plugs 224 of the second set as to axial length and selectively laterally locating the plugs of the second set to selectively modify carbon distribution in the filter.

In the foregoing description, certain terms have been used for brevity, clearness, and understanding. No unnecessary limitations are to be implied therefrom beyond the requirement of the prior art because such terms are used for descriptive purposes and are intended to be broadly construed. The different configurations, systems and method steps described herein may be used alone or in combination with other configurations, systems and method steps. It is to be expected that various equivalents, alternatives and modifications are possible within the scope of the appended claims. While a cylindrical filter roll is disclosed, the filter element may have various other shapes, including oval, racetrack, annular, rectangular, square, and so on.

What is claimed is:

1. An exhaust aftertreatment filter for filtering engine exhaust flowing along an axial direction, said filter being composed of regenerable material regenerated by heat to burn-off trapped contaminant particulate from said engine exhaust, comprising an axially extending filter element having wall segments extending axially between upstream and downstream ends, said wall segments defining axial flow channels therebetween, said wall segments being alternately sealed to each other by a first set of plugs to define a first set of flow channels closed by said plugs, and a second set of flow channels interdigitated with said first set of flow channels and having open upstream ends, said wall segments being alternately sealed to each other by a second set of plugs closing said second set of flow channels, said first set of flow channels having open downstream ends, a designated constituent material provided by at least one of a) a constituent material of said second set of plugs and b) a coating material along at least some of said wall segments including adjacent said second set of plugs, said designated constituent material undergoing an energy level change at a designated temperature, said energy level change being selected from the group consisting of i) phase change and ii) melting, and selected such that said energy level change at said designated temperature requires additional energy to effect said energy level change, to reduce maximum temperature experienced by said filter including during regeneration including during said burn-off of trapped contaminant particulate, wherein said designated constituent material is said constituent material of said second set of plugs, said plugs consisting of said designated constituent material, and said designated constituent material is selected to melt at a temperature in the range 550° C. to 1000° C.

2. The exhaust aftertreatment filter according to claim 1 wherein said designated constituent material is selected from the group consisting of hydroxides, carbonates, nitrates, and oxides.

3. The exhaust aftertreatment filter according to claim 1 wherein said engine exhaust is diesel engine exhaust, and wherein said designated constituent material is selected from the group consisting of calcium salt and barium salt, forming one of a carbonate and a nitrate when exposed to said diesel engine exhaust.

4. The exhaust aftertreatment filter according to claim 1 wherein said designated constituent material is $Ba(NO_3)_2$.

5. The exhaust aftertreatment filter according to claim 1 wherein said designated constituent material is $MoO_3$.

6. The exhaust aftertreatment filter according to claim 1 wherein said designated constituent material is selected to provide the reaction $CaCO_3 \rightarrow CaO+CO_2$.

7. The exhaust aftertreatment filter according to claim 1 wherein said designated constituent material is selected to provide the reaction $2(Fe_2O_3)+3C \rightarrow 4Fe+3CO_2$.

8. An exhaust aftertreatment filter for filtering engine exhaust flowing along an axial direction, said filter being composed of regenerable material regenerated by heat to burn-off trapped contaminant particulate from said engine exhaust, comprising an axially extending filter element having wall segments extending axially between upstream and downstream ends, said wall segments defining axial flow channels therebetween, said wall segments being alternately sealed to each other by upstream plugs to define a first set of flow channels closed by said plugs, and a second set of flow channels interdigitated with said first set of flow channels and having open upstream ends, said wall segments being alternately sealed to each other by downstream plugs closing said second set of flow channels, said first set of flow channels having open downstream ends, said downstream plugs consisting of a constituent material that melts at a temperature within a range of 550° C. to 1000° C.

9. The exhaust aftertreatment filter according to claim 8 wherein said designated constituent material comprises material selected from the group consisting of hydroxides, carbonates, nitrates, and oxides.

10. The exhaust aftertreatment filter according to claim 8 wherein said engine exhaust is diesel engine exhaust, and wherein said designated constituent material comprises material selected from the group consisting of calcium salt and barium salt, forming one of a carbonate and a nitrate when exposed to said diesel engine exhaust.

11. The exhaust aftertreatment filter according to claim 8 wherein said designated constituent material comprises $Ba(NO_3)_2$.

12. The exhaust aftertreatment filter according to claim 8 wherein said designated constituent material comprises $MoO_3$.

13. The exhaust aftertreatment filter according to claim 8 wherein said designated constituent material is selected to provide the reaction $CaCO_3 \rightarrow CaO+CO_2$.

14. The exhaust aftertreatment filter according to claim 8 wherein said designated constituent material is selected to provide the reaction $2(Fe_2O_3)+3C \rightarrow 4Fe+3CO_2$.

15. An exhaust aftertreatment filter for filtering engine exhaust flowing along an axial direction, said filter being composed of regenerable material regenerated by heat to burn-off trapped contaminant particulate from said engine exhaust, comprising an axially extending filter element having wall segments extending axially between upstream and downstream ends, said wall segments defining axial flow channels therebetween, said wall segments being alternately sealed to each other by upstream plugs to define a first set of flow channels closed by said plugs, and a second set of flow channels interdigitated with said first set of flow channels and having open upstream ends, said wall segments being alternately sealed to each other by downstream plugs closing said second set of flow channels, said first set of flow channels having open downstream ends, said downstream plugs consisting of a constituent material that melts at a temperature within a range of 550° C. to 1000° C., and said downstream plugs having variable axial lengths.

16. The exhaust aftertreatment filter according to claim 15 wherein said filter has a center core and said downstream plugs located at said center core have longer axial length than downstream plugs located elsewhere in said filter.

17. The exhaust aftertreatment filter according to claim 15 wherein said designated constituent material comprises material selected from the group consisting of hydroxides, carbonates, nitrates, and oxides.

18. The exhaust aftertreatment filter according to claim 15 wherein said engine exhaust is diesel engine exhaust, and wherein said designated constituent material comprises material selected from the group consisting of calcium salt and barium salt, forming one of a carbonate and a nitrate when exposed to said diesel engine exhaust.

19. The exhaust aftertreatment filter according to claim 15 wherein said designated constituent material comprises $Ba(NO_3)_2$.

20. The exhaust aftertreatment filter according to claim 15 wherein said designated constituent material comprises $MoO_3$.

21. The exhaust aftertreatment filter according to claim 15 wherein said designated constituent material is selected to provide the reaction $CaCO_3 \rightarrow CaO+CO_2$.

22. The exhaust aftertreatment filter according to claim 15 wherein said designated constituent material is selected to provide the reaction $2(Fe_2O_3)+3C \rightarrow 4Fe+3CO_2$.

\* \* \* \* \*